(12) United States Patent
Ohkawa

(10) Patent No.: US 9,300,012 B2
(45) Date of Patent: Mar. 29, 2016

(54) SOLID ELECTROLYTE SECONDARY BATTERY

(76) Inventor: Hiroshi Ohkawa, Nisshin (JP)

(*) Notice: Subject to any disclaimer, the term of this patent is extended or adjusted under 35 U.S.C. 154(b) by 194 days.

(21) Appl. No.: 13/699,661

(22) PCT Filed: May 31, 2011

(86) PCT No.: PCT/JP2011/003022
§ 371 (c)(1),
(2), (4) Date: Nov. 23, 2012

(87) PCT Pub. No.: WO2011/152028
PCT Pub. Date: Dec. 8, 2011

(65) Prior Publication Data
US 2013/0065098 A1    Mar. 14, 2013

(30) Foreign Application Priority Data

May 31, 2010 (JP) ................................ 2010-124560
Jun. 8, 2010 (JP) ................................ 2010-131178

(51) Int. Cl.
*H01M 2/02* (2006.01)
*H01M 4/38* (2006.01)
(Continued)

(52) U.S. Cl.
CPC ...... *H01M 10/3909* (2013.01); *H01M 10/0468* (2013.01); *H01M 10/38* (2013.01);
(Continued)

(58) Field of Classification Search
CPC ..................... H01M 10/3909; H01M 10/3918; H01M 10/3927; H01M 10/3936; H01M 10/3945; H01M 10/3954; H01M 10/3963; H01M 10/3972; H01M 10/3981
USPC ................................................. 429/101–104
See application file for complete search history.

(56) References Cited

U.S. PATENT DOCUMENTS 3,915,741 A * 10/1975 Kogiso et al. .................. 429/72
3,925,098 A    12/1975 Saunders et al.
(Continued)

FOREIGN PATENT DOCUMENTS

| CN | 101185185 A | 5/2008 |
|---|---|---|
| EP | 0 051 112 A1 | 5/1982 |

(Continued)

OTHER PUBLICATIONS

English Translation of JP 2002-184456.*
(Continued)

*Primary Examiner* — Stewart Fraser
(74) *Attorney, Agent, or Firm* — Oblon, McClelland, Maier & Neustadt, L.L.P.

(57) ABSTRACT

Provided is a solid electrolyte secondary battery with a greater capacity than previous solid electrolyte secondary batteries. Furthermore, the disclosed solid electrolyte secondary battery can obtain a high power output and improve battery function while ensuring a large capacity. The solid electrolyte secondary battery is provided with a cathode chamber, a cathode active material container that is provided independently and stores some cathode active material, and a channel medium that is provided between the two and through which the active material passes. The cathode active material is transferred by the channel medium and heterogeneity, when the active material is discharged, can be curbed. By providing a transfer medium, which transfers the cathode active material, the cathode active material can be forcibly transferred.

3 Claims, 9 Drawing Sheets

(51) Int. Cl.
*H01M 10/056* (2010.01)
*H01M 10/39* (2006.01)
*H01M 10/04* (2006.01)
*H01M 10/38* (2006.01)
*H01M 10/42* (2006.01)

(52) U.S. Cl.
CPC ........ *H01M10/3954* (2013.01); *H01M 10/425* (2013.01); *H01M 10/4214* (2013.01); *H01M 2300/0068* (2013.01)

(56) References Cited

U.S. PATENT DOCUMENTS

| | | | |
|---|---|---|---|
| 4,049,885 | A | 9/1977 | Mitoff |
| 6,428,585 | B1 | 8/2002 | Coetzer |
| 8,668,997 | B2 * | 3/2014 | Zaffou et al. .................. 429/51 |
| 2009/0017379 | A1 * | 1/2009 | Inatomi et al. ................ 429/213 |
| 2011/0223460 | A1 * | 9/2011 | Farmer ......................... 429/104 |
| 2011/0244277 | A1 * | 10/2011 | Gordon et al. .................. 429/51 |
| 2012/0135278 | A1 * | 5/2012 | Yoshie et al. ..................... 429/7 |
| 2014/0106234 | A1 * | 4/2014 | Fukunaga et al. ............ 429/246 |

FOREIGN PATENT DOCUMENTS

| | | |
|---|---|---|
| FR | 2 305 865 A1 | 10/1976 |
| JP | 50 33420 | 3/1975 |
| JP | 50 38030 | 4/1975 |
| JP | 58-137974 A | 8/1983 |
| JP | 63 66863 | 3/1988 |
| JP | 63 271865 | 11/1988 |
| JP | 2 112168 | 4/1990 |
| JP | 3 187160 | 8/1991 |
| JP | 5 266921 | 10/1993 |
| JP | 6 89739 | 3/1994 |
| JP | 6 196204 | 7/1994 |
| JP | 7 176328 | 7/1995 |
| JP | 10 302830 | 11/1998 |
| JP | 11 121031 | 4/1999 |
| JP | 2001 93570 | 4/2001 |
| JP | 2001 102087 | 4/2001 |
| JP | 2001-118598 A | 4/2001 |
| JP | 2001 243975 | 9/2001 |
| JP | 2002184456 * | 6/2002 |
| JP | 2004 178991 | 6/2004 |

OTHER PUBLICATIONS

International Search Report Issued Sep. 6, 2011 in PCT/JP11/03022 Filed May 31, 2011.
Office Action issued Mar. 11, 2014 in Japanese Patent Application No. 2012-518246 (with English language translation).
Combined Chinese Office Action and Search Report issued Jun. 27, 2014, in Chinese Patent Application No. 201180025980.5 with English translation of category of cited documents.
Office Action issued on Dec. 16, 2014 in Japanese Patent Application No. 2012-518246 with English translation.
Extended European Search Report issued Jul. 27, 2015 in Patent Application No. 11789442.8.
Communication Pursuant to Rules 70(2) and 70a(2) EPC issued Aug. 13, 2015 in European Patent Application No. 11789442.8.

* cited by examiner

SOLID ELECTROLYTE SECONDARY BATTERY

TECHNICAL FIELD

The present invention relates to a secondary battery using a solid electrolyte, such as β-alumina.

BACKGROUND OF THE ART

Secondary batteries have been used in each vehicles such as automobile, aircraft, and agricultural machinery, as well as the various pieces of equipment such as digital cameras, notebook computers and mobile phones. Among them, in recent years, sodium sulfur battery has been attracting attention as a secondary battery that can store large amount of power.

Sodium-sulfur battery has a positive electrode chamber where molten sulfur which is positive electrode active material is housed, negative electrode chamber where molten sodium which is negative electrode active material is housed, and wall-shaped solid electrolyte which is made of materials such as β alumina having a permeable to sodium ions, is located between said positive electrode chamber and said negative electrode chamber, and isolate the molten sodium and the molten sulfur.

In this sodium-sulfur battery, in a state of being heated to operating temperature of 290-350° C., molten sodium in the negative electrode chamber transmits through the solid electrolyte, acts as a sodium ion, reacts with sulfur in the positive electrode chamber, then discharge is carried out to generate a sodium polysulfide. Also, when charging, the reverse reaction proceeds at the time of discharge, sodium polysulfide is decomposed, sodium and sulfur are generated.

In this case, molten sulfur which is positive electrode active material, and sodium polysulfide which is reaction product have large specific gravity. Especially the sodium sulfide has large specific gravity because it is high ratio of sodium. For this reason, they tended to accumulate at the bottom of the positive electrode chamber by its own weight. Thus, these substances are not able to involved fully in charge and in discharge, the utilization of active material has decreased.

In order to prevent such a phenomenon, in Japanese Patent Laid-Open No. H5-266921(1993), a shape of the positive electrode chamber of sodium-sulfur battery, formed on the outer peripheral side of the bulkhead β-alumina tube that houses the molten sulfur as a positive electrode active material has been disclosed. The shape of the positive electrode chamber is formed such that the horizontal cross-sectional area becomes smaller at the bottom.

As a result, sodium ratio of sodium polysulfide of the bottom of the positive electrode chamber is lower than the ratio of the top at the time of charging, and this prevents the sodium sulfide which is a high percentage of sodium from concentrating at the bottom of the positive electrode chamber.

In addition, in Japanese Patent Laid-Open No. H6-89739 (1994), a sodium-sulfur battery which is formed that the bulk density of the lower part of the conductive material for the positive electrode impregnated with molten sulfur is higher than the bulk density of the upper part is disclosed. Thus, reactions of the active material like sodium polysulfide occur rapidly, utilization at the lower part of the active material is improved.

And it says that the phenomenon that sodium polysulfide is accumulated at the lower part can be prevented.

Further, sodium-sulfur battery has been receiving attention as energy storage, because it has an ability to store large amounts of power. As a method to increase the battery capacity of the sodium-sulfur battery, Japanese Patent Laid-Open No. 2004-178991 can be mentioned as an example.

In this case, a way of to increase the battery capacity by increasing the packing densities of molten sulfur which is the positive electrode active material and molten sodium which is the negative electrode active material has been disclosed.

However, by the above method, there is a limit to increasing the battery capacity per unit cell because capacities of the positive electrode chamber where molten sulfur which is positive electrode active material is housed and the negative electrode chamber where molten sodium which is negative electrode active material is housed are constant.

On the other hand, if the capacity of the storage chamber where active material is housed is increased, it is also possible to store large amounts of active material. However, increasing the capacity of the storage chamber causes the cell reaction be reduced because area which acts as a partition wall of the solid electrolyte in contact with the active material becomes relatively small. In addition, since storage chamber is a space formed by being partitioned by the solid electrolyte that stores large amount of active material in there, there is a problem from the viewpoint of safety.

In addition, in Japanese Patent Laid-Open No. S50-38030 (1975), a sodium-sulfur battery is disclosed. In the battery, molten sodium is housed in a sodium storage container which is located separately and remotely from a solid electrolyte. And sodium is supplied to pores provided in the plate-shape solid electrolyte from this storage container.

PRIOR ART REFERENCES

Patent Literature
Japanese Patent Laid-Open No. H5-266921(1993): Patent Document 1
Japanese Patent Laid-Open No. H6-89739(1994): Patent Document 2
Japanese Patent Laid-Open No. 2004-178991: Patent Document 3
Japanese Patent Laid-Open No. H2-112168(1990): Patent Document 4
Japanese Patent Laid-Open No. S50-38030(1975): Patent Document 5
Japanese Patent Laid-Open No. H3-187160(1991): Patent Document 6
Japanese Patent Laid-Open No. H6-196204(1994): Patent Document 7
Japanese Patent Laid-Open No. 2001-93570: Patent Document 8
Japanese Patent Laid-Open No. 2001-102087: Patent Document 9
Japanese Patent Laid-Open No. 2001-243975: Patent Document 10
Japanese Patent Laid-Open No. H7-176328(1995): Patent Document 11
Japanese Patent Laid-Open No. H11-121031(1999): Patent Document 12
Japanese Patent Laid-Open No. H10-302830(1998): Patent Document 13
Japanese Patent Laid-Open No. S63-271865(1988): Patent Document 14
Japanese Patent Laid-Open No. S63-66863(1988): Patent Document 15

SUMMARY OF THE INVENTION

Problems to be Solved by the Invention

The primary purpose of the present invention is to provide a solid electrolyte secondary battery which suppresses the deterioration of the positive electrode active material of the solid electrolyte secondary battery and has higher performance.

The second purpose of the present invention is to provide a solid electrolyte secondary battery having a larger battery capacity.

Further, the third purpose of the present invention is to provide a solid electrolyte secondary battery which can obtain a large output and improve battery performance while maintaining a large battery capacity.

Means for Solving the Problems

Solid electrolyte secondary battery of the present invention is a second battery comprising a positive electrode chamber where positive electrode active material is housed at least, a negative electrode chamber where negative electrode active material is housed at least, and a wall-shaped solid electrolyte which is located between said positive electrode chamber and said negative electrode chamber, isolates said positive electrode active material and said negative electrode active material, and has conductivity for said negative electrode active material.

And the solid electrolyte secondary battery of the present invention is characterized by comprising a positive storage container which is independent from said positive electrode chamber and houses a part of said positive electrode active material, and a passage means which circulates in one direction to move said positive electrode active material from said positive electrode chamber to said positive storage container, and further circulates from said positive storage container to said positive electrode chamber.

In the secondary battery of the present invention, the positive storage container which is independent of the positive electrode chamber and houses a part of the positive electrode active material is provided, and the passage means which circulates the positive electrode active material in one direction between the positive electrode chamber and the positive storage container is also provided. Thus, the positive electrode active material housed in the positive electrode chamber circulates and moves into the positive electrode chamber again through the positive storage container by the passage means. In other words, the positive electrode active material housed in the positive electrode chamber is moving.

For this reason, it is possible to suppress the phenomenon that the positive electrode active material concentrates and accumulates at the bottom of the positive electrode chamber.

In addition, since the positive electrode active material circulates and moves in one direction, the concentration of the positive electrode active material in the positive electrode chamber can be kept substantially uniform. Therefore, it is possible to use the active material efficiently and improve the battery performance.

The positive electrode active material is a substance to form a compound that reacts with the negative electrode active material, and is typified by sulfur. The negative electrode active material is a metal typified by sodium, and is a candidate as well as lithium, such as potassium. Moreover, the wall-shaped solid electrolyte is a ceramic such as β-alumina or β"-alumina. And it acts as a bulkhead for transmitting the negative electrode active material and for separating the negative electrode active material from the positive electrode active material. Therefore, the shape of the solid electrolyte is not particularly limited.

The shape of the solid electrolyte may be a container shape body which has a positive electrode chamber where the positive electrode active material is housed and a negative electrode chamber where the negative electrode active material is housed.

In addition, the positive storage container which is independent of the positive electrode chamber is a container that the pressure of the positive electrode chamber, which is varying by discharge and charge of the battery does not cause a large pressure fluctuations between the positive storage container and the positive electrode chamber, if there is no mass transfer such as gas or positive electrode active material.

Moreover, the positive storage container can be provided in the inner wall which partitions the positive electrode chamber and can be also provided at a position which is quite different from the part to partition the positive electrode chamber.

Here, the passage means refers to the one continuous internal space where the positive electrode active material can pass through. For example, an axis space of a pipe, or an internal space of a block material can be the passage means. This passage means is preferably provided with a first passage having a first one-way valve which makes the positive electrode active material move to the positive storage container from the positive electrode chamber and a second passage having a second one-way valve which makes the positive electrode active material to the positive electrode chamber from the positive storage container.

The one-way valve has the function to keep constant the direction of fluid flow and to prevent backflow. The one-way valve, for example, is opened by the pressure of the fluid, and is closed by the back pressure if the fluid flows back.

At the time of discharge, in the solid secondary battery, because the negative electrode active material which is ionized moves to the positive electrode chamber from the negative electrode chamber, the amount of the active material increases in the positive electrode chamber, and the liquid level of the active material of inside the positive electrode chamber rises gradually Therefore, the pressure in the positive electrode chamber increases progressively. As a result, the pressure in the positive electrode chamber is higher than the pressure in the positive storage container, and the first one-way valve is opened by that pressure difference. Then the positive electrode active material moves to the positive storage container from the positive electrode chamber through the first passage.

In this case, since the second one-way valve does not open in the direction that the positive electrode active material is flowing to the positive storage container from the positive electrode chamber, the positive electrode active material is not to be moved through the second passage.

On the other hand, when charging, because the negative electrode active material which is ionized moves to the negative electrode chamber from the positive electrode chamber, the amount of the active material is reduced in the positive electrode chamber, and the liquid level of the active material of inside the positive electrode chamber falls gradually. Therefore, the pressure in the positive electrode chamber which is closed space becomes lower progressively.

In addition, since the liquid level of the positive electrode active material storage container has risen by the positive electrode active material by the reaction at the time of discharge, the pressure in the positive storage container which is also closed space is higher. As a result, the pressure in the positive storage container is higher than the pressure in the positive electrode chamber, and the second one-way valve is opened by that pressure difference. Then the positive electrode active material moves to the positive electrode chamber from the positive storage container through the second passage. The positive storage container acts as an auxiliary positive electrode chamber.

In this case, since the first one-way valve does not open in the direction that the positive electrode active material is flowing to the positive electrode chamber from the positive storage container, the positive electrode active material is not to be moved through the first passage.

As mentioned above, the passage means has a simple structure, and is able to make the positive electrode active material circulate and move in one direction easily.

It is preferable that the one entrance of the first and the second passages is disposed at the top of the positive electrode chamber, and the outlet is disposed at the top of the positive storage container. Also, it is preferable that the other entrance of the first and the second passages is disposed at the bottom of the positive storage container, and the outlet is disposed at the bottom of the positive electrode chamber.

Thus, much more positive electrode active material in the positive electrode chamber and the positive storage container circulate, and homogeneity of the positive electrode active material of positive electrode chamber increases further.

The solid electrolyte secondary battery of the present invention can be provided of a moving means which circulates in one direction to move the positive electrode active material from the positive electrode chamber to the positive storage container, and further circulates it from the positive storage container to the positive electrode chamber.

As a result, the positive electrode active material coming from the positive storage container provided separately from the positive electrode chamber as well as the positive electrode active material housed in the positive electrode chamber is used to a charge-discharge reaction. Therefore, the battery capacity can be increased.

In addition, the moving means is preferably arranged in the passage means. As a moving means, a pump is preferred.

In the present invention, it is preferable that a control means which controls the moving means is provided. The control means, for example, adjusts the amount and speed to move of the positive electrode active material depending on charging and discharging of the battery by controlling the operating status of the moving means.

Also, the control means is for example, an electronic control unit having a calculating unit which performs calculation and control, a storage unit, and an input and output unit, etc. The electronic control unit can perform the above-described control based on the measurement results of the instrument such as a flow sensor.

Here, the container shape body of the solid electrolyte means a shape of accommodation space which is partitioned by an inner wall surface of the solid electrolyte. When a lid and a bottom, or the lid or the bottom is provided to the space partitioned by the inner wall surface of the container shape body, the space becomes closed interval. This closed interval is a liquid storage space such as the positive electrode chamber or the negative electrode chamber.

In addition, the positive electrode chamber and the negative electrode chamber can be a hole-shape extending along the axial direction side by side together. An external form of the container shape body which has the hole-shaped positive electrode chamber and the negative electrode chamber can be a pillar shape body. Here, the pillar shape body is a shape that extends in the direction of uniaxial. More specifically, the outer peripheral shape can be any shape such as circular shape, oval, triangle, or square, etc.

The pillar shape body may have at least one positive electrode chamber extending in the axial direction. And the cross-sectional shape of the positive electrode chamber can be any shape such as round, oval, triangle, square, etc. This pillar shape body becomes simple and easy to manufacture because it extends in the axial direction.

In addition, the negative electrode chamber extending in the axial direction can be formed that a cross-sectional area is smaller than the cross-sectional area of the positive electrode chamber. And the negative electrode chamber can be placed inside the pillar shape body along the wall surface of the positive electrode chamber and apart from the wall surface.

More specifically, plurality of negative electrode chamber is formed around the positive electrode chamber. A part of the gap between the positive electrode chamber and the negative electrode chamber functions primarily as an electrolyte.

In the present invention, a biasing member may be provided. The biasing member is contact with the outer surface of the container shape of the solid electrolyte body and presses the outer surface. This biasing member can be, for example, a thin mat of compressed fiber having heat resistance, such as carbon fiber and glass fiber.

The biasing member abuts and presses elastically against the outer surface of at least a portion of the container shape of the solid electrolyte toward the side of its central body container shape. Therefore, when the container body is cracked, the biasing member forces the damaged container body to close the crack part.

Therefore, by providing a biasing member, the occurrence of cracks in the container body is suppressed, it is possible to prevent the mixing of the positive electrode active material and negative electrode active material. A band can be mentioned as other biasing member. The tightening force of the band is used as the biasing force.

The present invention preferably comprises a negative storage container communicating with the negative electrode chamber to send and receive the negative electrode active material.

It is also preferable that the amount of the negative electrode active material housed in the negative electrode chamber of the container shape body is reduced by that most of the negative electrode active material are housed in this negative storage container.

By using the negative storage container, most of the negative electrode active material and the positive electrode chamber can be kept away from each other. Therefore, safety is increased.

Also, since a large amount of the negative electrode active material can be housed in the negative storage container, it is possible to increase the battery capacity.

BEST MODE FOR CARRYING OUT THE INVENTION

A Description of Embodiments

The present invention will be described more specifically with references to examples of the solid electrolyte secondary battery of the present invention.

Example 1

Figure 1:
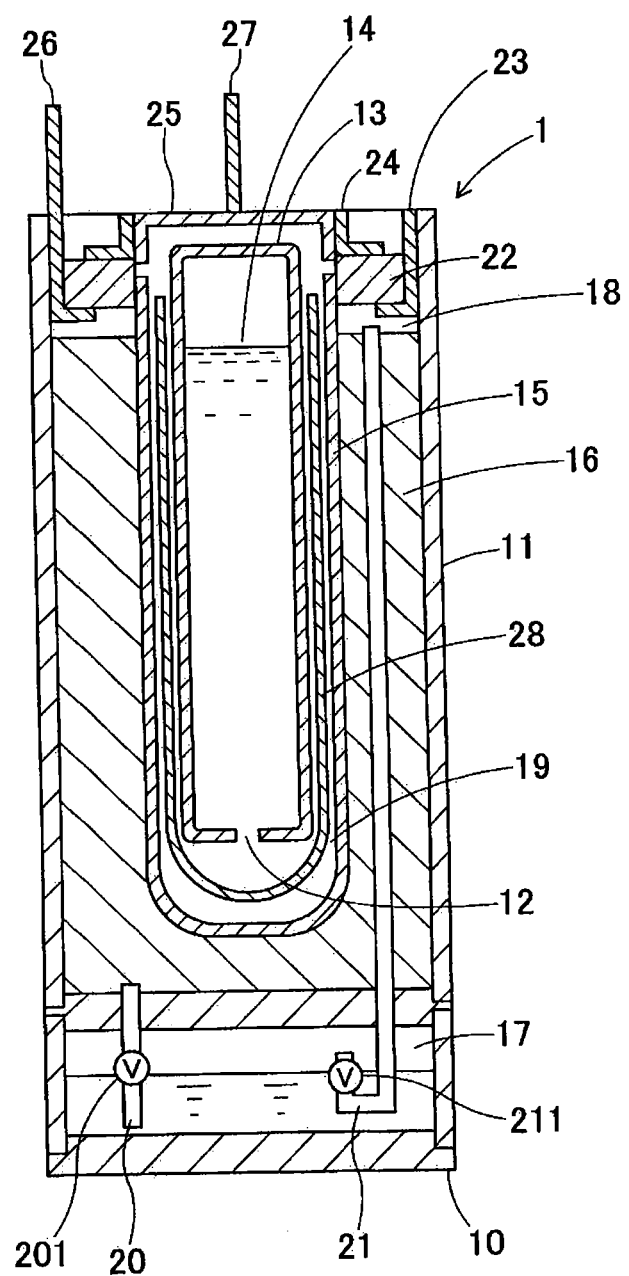
FIG. 1 is a longitudinal sectional view of a sodium-sulfur battery of Example 1.
Figure 3:
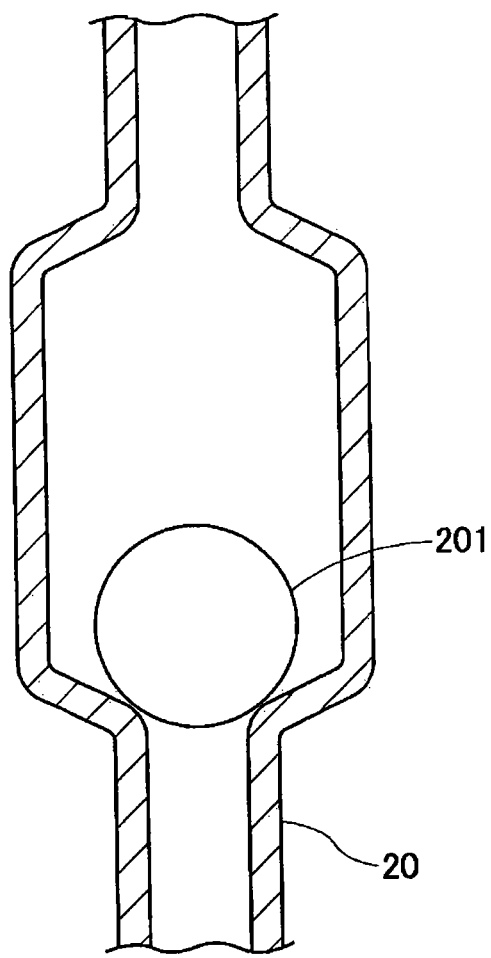
FIG. 3 is a cross-sectional view of a check valve.

FIG. 1 shows a longitudinal cross-sectional view of a sodium-sulfur battery 1 of the first embodiment of the present invention. And FIG. 3 shows a cross-sectional view of a check valve. This sodium-sulfur battery 1 is composed primarily of a positive electrode container 11 of a bottomed cylindrical shape made of a metal, a solid electrolyte tube 15 of a bottomed cylindrical shape made of β alumina arranged on the inside of the positive electrode container 11, a negative electrode container 13 of a bottomed cylindrical shape arranged on the inside of the solid electrolyte tube 15 and provided with a small hole 12 at the bottom, an auxiliary container 10 of a bottomed cylindrical shape made of metal arranged integrally at the lower end of the positive electrode container 11, a supply tube 20 made of a metal and extending in the axial direction, and a recovery pipe 21.

Here, the auxiliary container 10 makes up the positive electrode active material container of the present invention. And, molten sulfur 16 is accommodated in the positive electrode chamber 18 which is partitioned by the inner peripheral surface of the positive electrode container 11 and the outer peripheral surface of the solid electrolyte tube 15 and formed as a closed space as noted below, molten sodium 14 is accommodated in the negative electrode container 13. A part of molten sulfur 16 is accommodated in an auxiliary chamber 17 which is formed as a closed space by the bottom of the auxiliary container 10 and the positive electrode container 11.

The supply pipe 20 passes through the bottom of the positive electrode container 11, is welded at its through portion, and communicates with the positive electrode chamber 18 and the auxiliary chamber 17. One end portion of the supply pipe 20 is disposed at the bottom of the auxiliary chamber 17. The other end part is disposed at the bottom of the positive electrode chamber 18. Then, as shown in FIG. 3, a check valve 201 is provided in the supply pipe 20. The bottom of the auxiliary chamber 17 becomes the inlet of the supply pipe 20, and the bottom of the positive electrode chamber 18 becomes the outlet of that. The check valve 201 is an one-way valve which allows the molten sulfur 16 to flow to the bottom of the positive electrode chamber 18 from the bottom of the auxiliary chamber 17.

The recovery pipe 21 passes through the bottom of the positive electrode container 11, is welded at its through portion, and communicates with the positive electrode chamber 18 and the auxiliary chamber 17. One end portion of the recovery pipe 21 is disposed at the top of the positive electrode chamber 18 and the other end portion is disposed at the bottom of the auxiliary chamber 17. Then, a check valve 211 is provided in the recovery pipe 21, the top of the positive electrode chamber 18 becomes the inlet of the recovery pipe 21 and the top of the auxiliary chamber 17 becomes the outlet of that. The check valve 211 is an one-way valve which allows the molten sulfur 16 to flow from the top of the positive electrode chamber 18 to the bottom of the auxiliary chamber 17. The check valve 211 is an one way valve, and the direction is that molten sulfur 16 flows to the bottom of the auxiliary chamber 17 from the top of the positive electrode chamber 18.

In addition, the check valve 211 is the same as those shown in FIG. 3. The positive electrode container 11 and the solid electrolyte tube 15 are coupled with through an insulating ring 22 and a positive electrode bracket 23. Thus, the positive electrode chamber 18 becomes enclosed space.

In addition, a negative electrode bracket 24 is joined to the top surface of the insulating ring 22, and a negative electrode lid 25 is fixed by welding to this negative electrode bracket 24. A positive terminal 26 is arranged at the upper outer periphery of the positive electrode container 11, and a negative terminal 27 is arranged on the upper surface of the negative electrode lid 25. A safety tube 28 of a bottomed cylindrical shape is provided at the outside of the negative electrode container 13 and at the inside of the solid electrolyte tube 15. At the time of discharge, in this sodium-sulfur battery 1, the molten sodium 14 in the negative electrode container 13 is supplied into the safety tube 28 through the small hole 12, and the safety tube 28 is filled with the supplied molten sodium 14.

Further, the molten sodium 14 is supplied into the negative electrode chamber 19 formed between the solid electrolyte tube 15 and the safety tube 28. And the molten sodium 14 in the negative electrode chamber 19 acts as a sodium ion, transmits through the solid electrolyte tube 15, moves into the positive electrode chamber 18, discharges in contact and react with sulfur to generate sodium sulfide.

When charging, sodium sulfide in the positive electrode chamber 18 is decomposed, becomes sodium ions and the molten sulfur 16. Sodium ions pass through the solid electrolyte tube 15, move into the negative electrode chamber 19 to generate the molten sodium 14, and are returned to the negative electrode container 13.

In this way, at the time of discharge, because the molten sodium 14 which is ionized moves to the positive electrode chamber 18 from the negative electrode chamber 19, the amount of the sodium sulfide increases in the positive electrode chamber 18, and the liquid surface of inside the positive electrode chamber 18 rises gradually. Therefore, the pressure in the positive electrode chamber which is a closed space increases progressively.

As a result, the pressure in the positive electrode chamber 18 side is higher than the pressure in the auxiliary chamber 17 side, and the check valve 211 in the recovery pipe 21 is opened by that pressure difference. Then, the molten sulfur 16 moves to the auxiliary chamber 17 from the positive electrode chamber 18 through the recovery pipe 21.

In this case, since the check valve 201 in the supply pipe 20 does not open in the direction that the molten sulfur 16 is flowing to the auxiliary chamber 17 from the positive electrode chamber 18, the molten sulfur 16 is not to be moved through the supply pipe 20.

On the other hand, when charging, because the molten sodium 14 which is ionized moves to the negative electrode chamber 19 from the positive electrode chamber 18, the amount of the sodium polysulfide is reduced in the positive electrode chamber 18, and the liquid surface of inside the positive electrode chamber 18 falls gradually. Therefore, the pressure in the positive electrode chamber 18 which is a closed space becomes lower progressively.

In addition, because the liquid surface of the auxiliary chamber 17 has risen by the molten sulfur 16 by the reaction at the time of discharge, the pressure in the auxiliary chamber 17 which is also closed space is higher. As a result, the pressure in the auxiliary chamber 17 side is higher than the pressure in the positive electrode chamber 18 side, and the check valve 201 in the supply pipe 20 is opened by that pressure difference. Then, the molten sulfur 16 moves to the positive electrode chamber 18 from the auxiliary chamber 17 through the supply pipe 20.

In this case, since the check valve 211 in the recovery pipe 21 does not open in the direction that the molten sulfur 16 is flowing to the positive electrode chamber 18 from the auxiliary chamber 17, the molten sulfur 16 is not to be moved through the recovery pipe 21. For this reason, it is possible to suppress the phenomenon that the sodium polysulfide concentrates and accumulates at the bottom of the positive electrode chamber 18.

In addition, since the molten sulfur 16 circulates and moves in one direction, the concentration of the molten sulfur 16 in the positive electrode chamber 18 can be kept substantially uniform. Therefore, it is possible to use the active material efficiently and improve the battery performance.

Example 2

Figure 2:
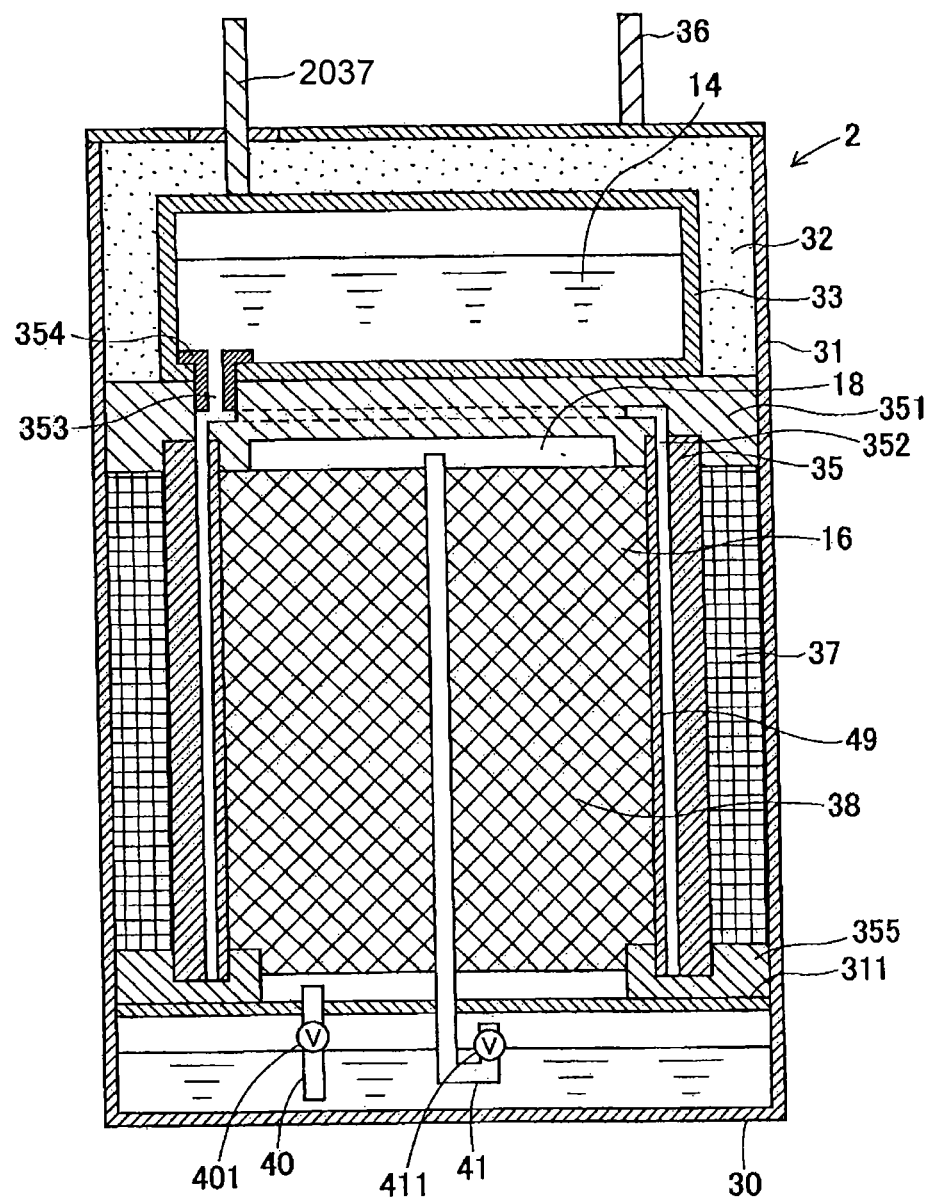
FIG. 2 is a longitudinal sectional view of a sodium-sulfur battery of Example 2.

FIG. 2 shows a longitudinal sectional view of a sodium-sulfur battery 2 of the second embodiment of the present invention. This sodium-sulfur battery 2 is composed primarily by a cylindrical protection can 31 made of metal, a sodium container 33 maintained through an insulator 32 which is formed of glass fiber mat at the upper part of inside space of this protection can 31, a container body 35 of cylindrical produced by β alumina and maintained at the lower part of inside space of this protection can 31, an auxiliary container 30 of bottomed cylindrical shape made of metal arranged integrally at the lower end of the protection can 31, a supply tube 40 made of metal and extending in the axial direction, and a recovery pipe 41.

The auxiliary container 30 constitutes a positive electrode active material storage container of the present invention. Then, the container body 35 is a tubular thick, and an internal space corresponds to the axial hole is the positive electrode chamber 18. Pore-shaped negative electrode chamber 49 extending in the axial direction at short intervals along the inner circumferential surface of this container body 35 is formed a lot apart from in the circumferential direction. The positive electrode chamber 18 is formed as a closed space as described below, and the molten sulfur 16 is housed in it. Also, molten sodium 14 is accommodated in the sodium container 33 and a part of the molten sulfur 16 is accommodated in the positive electrode chamber 18 which is formed as a closed space by a bottom lid 311 which is the bottom of the auxiliary container 30 and the protection can 31.

The supply pipe 40 passes through the bottom lid 311, is welded at through portion, and communicates with the positive electrode chamber 18 and the auxiliary container 30. One end portion of the supply pipe 40 is disposed at the bottom of the auxiliary container 30, and the other end part is disposed at the bottom of the positive electrode chamber 18.

Then, a check valve 401 is provided in the supply pipe 40, the bottom of the auxiliary container 30 becomes the inlet of the supply pipe 40, and the bottom of the positive electrode chamber 18 becomes the outlet of that. The check valve 401 is in one direction, and the direction is that the molten sulfur 16 flows to the bottom of the positive electrode chamber 18 from the bottom of the auxiliary container 30.

The recovery pipe 41 passes through the bottom lid 311, is welded at through portion, and communicates with the positive electrode chamber 18 and the auxiliary container 30. One end portion of the recovery pipe 41 is disposed at the top of the positive electrode chamber 18, and the other end part is disposed at the top of the auxiliary container 30.

Then, a check valve 411 is provided in the recovery pipe 41, the top of the positive electrode chamber 18 becomes the inlet of the recovery pipe 41, and the top of the auxiliary container 30 becomes the outlet of that. The recovery pipe 41 is in one direction, and the direction is that the molten sulfur 16 flows to the bottom of the auxiliary container 30 from the top of the positive electrode chamber 18.

A lid 351 formed of α-alumina is fixed integrally bonded with the glass adhesive material etc, on the upper end surface of a cylindrical body 35. This lid 351 has a ring-shaped groove on its lower surface, and the opening surface of this groove becomes a ring-shaped passage 352 by closing at the upper end surface of the cylindrical body 35. This ring-shaped passage 352 communicates with the upper end opening of all negative electrode chambers 49 of the cylindrical body 35. The cylindrical body 35 has a vertical passage 353 extending from the upper surface of this lid 351 to the ring-shaped passage 352. Lower end surface of the cylindrical body 35, sealing ring 355 formed by the α-alumina is fixed integrally bonded to the glass adhesive material or the like.

Sodium storage container 33 is placed on top of the lid 351. A through hole is formed at the bottom of the sodium storage container 33, and the connecting pipe 354 made of metal with a shaft hole is bonded by pressing to the vertical passage 353 which are common hole of the through hole. Molten sodium 14 is maintained in the sodium storage container 33, passes through the axial hole of the connecting pipe 354, the vertical passage 353, and the ring-shaped passage 352, flows into all of negative electrode chamber 49, then, the negative electrode chamber 49 is filled with it.

In addition, in between the outer peripheral surface of the cylindrical body 35 and the inner peripheral surface of the protection can 31, the biasing member 37 consisting of carbon fiber mat in the thickness direction is held in the protection can 31. A current collector 38 made of carbon fiber compressed which is impregnated with the molten sulfur 16 is bonded by pressing to the positive electrode chamber 18 which is formed in the cylindrical body 35. Further, the recovery pipe 41 made of metal is provided in the central portion of this current collector 38 and functions as anode. At the bottom of the positive electrode chamber 18, the bottom lid 311 made of metal is bonded by glass adhesive to the lower end surface of the cylindrical body 35. By the above, the positive electrode chamber 18 is formed as a closed space. And the bottom lid 311 becomes the bottom of the protection can 31 by being welded to the side peripheral portion of the protection can 31.

Further, the sodium storage container 33 is joined to the cathode terminal 2037, the upper portion of that protrudes upwardly through the through hole of the protection can 31. Furthermore, on the upper side of the protection can 31, anode terminal 36 has been junction.

At the time of discharge, in this sodium-sulfur battery 2, the molten sodium 14 in the negative electrode chamber 49 acts as a sodium ion, transmits through the portion of the bulkhead of the solid electrolyte in the cylindrical body 35, moves to the positive electrode chamber 18, reacts with molten sulfur 16, and discharges to generate sodium sulfide. The same amount of molten sodium 14 which was moved to the positive electrode chamber 18 from the negative electrode chamber 49 by discharge is replenished from molten sodium 14 housed in the sodium storage container 33.

Therefore, at the time of discharge, the molten sodium 14 in the sodium storage container 33 is reduced and sodium sulfide in the positive electrode chamber 18 is increased.

When charging, sodium sulfide in the positive electrode chamber 18 is decomposed, becomes sodium ions and molten sulfur 16. And sodium ions pass through a portion of the solid electrolyte partition of the cylindrical body 35, move to the negative electrode chamber 49 to generate molten sodium 14, and are returned to the sodium storage container 33.

In the same manner as in Example 1, the molten sulfur 16 is circulated and moved inside of the positive electrode chamber 18 and inside of the auxiliary container 30 through the recovery pipe 41 and the supply pipe 40 by the pressure difference between the positive electrode chamber 18 and the auxiliary container 30 at the time of charge and discharge. By this circulation and movement of the molten sulfur 16, it is possible to suppress the phenomenon that the sodium polysulfide concentrates and accumulates at the bottom of the positive electrode chamber 18.

In addition, since the molten sulfur 16 circulates and moves in one direction, the concentration of the molten sulfur 16 in the positive electrode chamber 18 can be kept substantially uniform. Therefore, it is possible to use the active material efficiently and improve the battery performance.

Example 3

Figure 4:
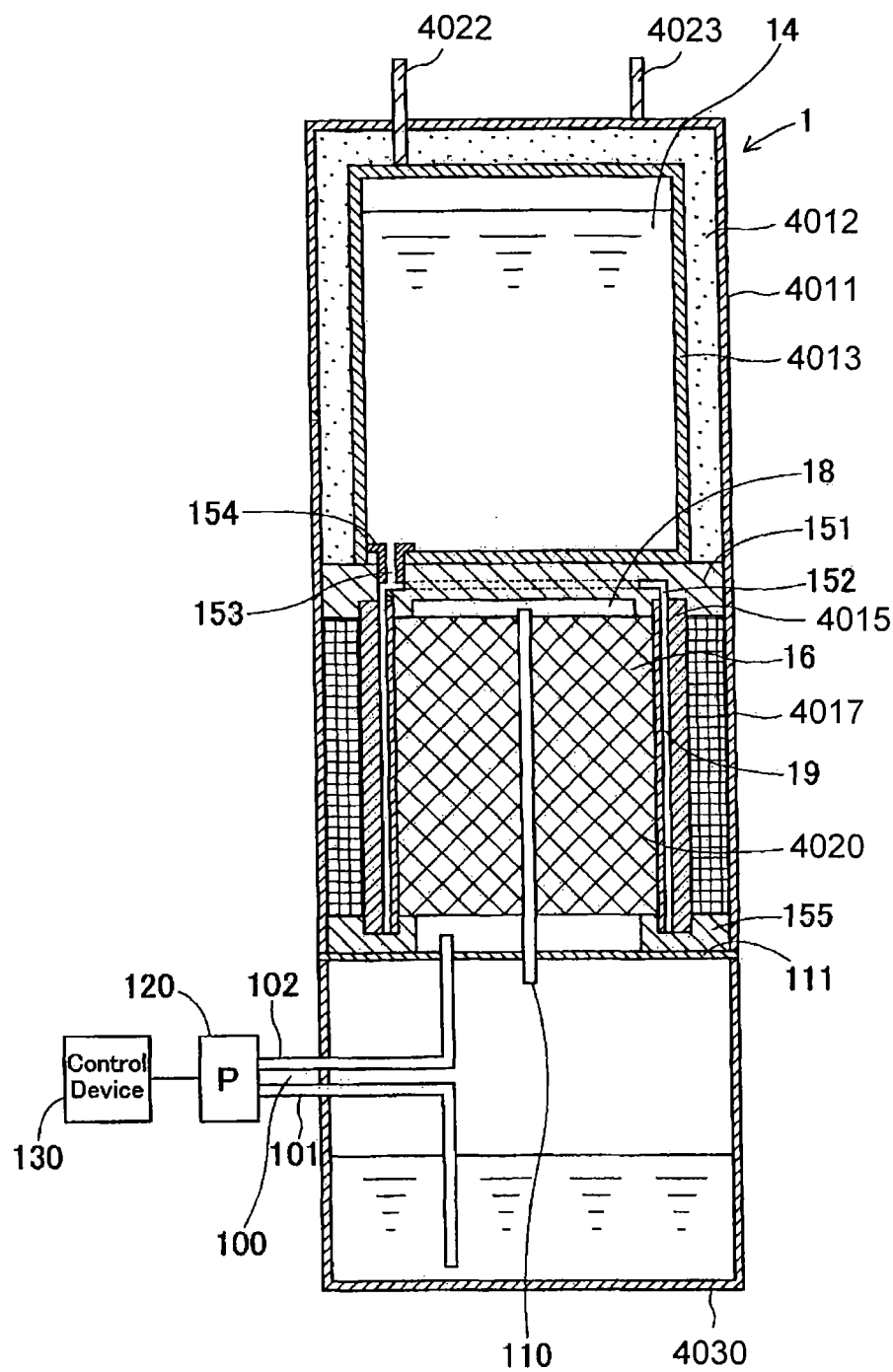
FIG. 4 is a longitudinal sectional view of a sodium-sulfur battery of Example 3.

FIG. 4 shows a longitudinal sectional view of a sodium-sulfur battery 1 of the third embodiment of the present invention. This sodium-sulfur battery 1 is composed primarily by a cylindrical protection can 4011 made of metal, a sodium container 4013 maintained through the insulator 4012 which is formed of glass fiber mat at the upper part of inside space of this protection can 4011, a cylindrical body 4015 formed of the β alumina and maintained at the lower part of inside space of the protection can 4011, a sulfur storage container 4030 of bottomed cylindrical shape made of metal arranged integrally at the lower end of the protection can 4011, a supply tube 100 made of metal, a recovery pipe 110, a pump 120 which is arranged at outside of the protection can 4011 and supplies the molten sulfur 16 through the supply tube 100, and a control device 130 which is connected with the pump 120 and controls the drive of it.

And the cylindrical body 4015 is wall thickness, and an internal space of it corresponds to the axial hole is the positive electrode chamber 18. Pore-shaped negative electrode chambers 19 extending in the axial direction at short intervals along the inner circumferential surface of the cylindrical body 4015 are formed a lot apart from in the circumferential direction. The positive electrode chamber 18 is formed as a closed space as described below, and the molten sulfur 16 is housed in it.

Also, the molten sodium 14 is accommodated in the sodium container 4013 and a part of the molten sulfur 16 is accommodated in the sulfur container 4030. The supply pipe 100 consists of the first supply pipe portion 101 which connects the sulfur storage container 16 and the pump 120, and the second supply pipe portion 102 which connects the pump 120 and the positive electrode chamber 18.

The first supply pipe portion 101 passes through the side of the protection can 4011, is welded at through portion, and communicates with the pump 120 beyond.

Inlet of it is arranged at the bottom of the sulfur storage container 4030. The second supply pipe portion 102 passes through the bottom lid 111, is welded at through portion, further passes through the side of the protection can 4011, is welded at through portion, and communicates with the pump 120 beyond. Outlet of it is arranged at the bottom of the positive electrode chamber 18.

The recovery pipe 110 passes through the bottom lid 111, is welded at through portion, and communicates with the positive electrode chamber 18 and the sulfur storage container 4030. Inlet of it is arranged at the top of the positive electrode chamber 18 and outlet of it is arranged at the top of the sulfur storage container 4030. On the top end surface of the cylindrical body 4015, the lid 151 made of α-alumina is fixed integrally by glass adhesive etc.

This lid 151 has a ring-shaped groove on its lower surface, and a ring-shaped passage 152 is formed by that the opening surface of this groove is closed by the upper end surface of the cylindrical body 4015. This ring-shaped passage 152 communicates with the upper end opening of all negative electrode chambers 19 of the cylindrical body 4015. The cylindrical body 4015 has a vertical passage 153 extending from the upper surface of this lid 151 to the ring-shaped passage 152.

Sealing ring 155 formed of the α-alumina is fixed integrally bonded to the glass adhesive etc., to the lower end surface of the cylindrical body 4015. Sodium storage container 4013 is placed on top of the lid 151. A through hole is formed at the bottom of the sodium storage container 4013, and the connecting pipe 154 made of metal with a shaft hole is bonded by pressing to the vertical passage 153 which are common hole of this through hole.

Molten sodium 14 is maintained in the sodium storage container 4013, passes through the axial hole of the connecting pipe 154, the vertical passage 153, and the ring-shaped passage 152, flows into all of negative electrode chambers 19, then, the negative electrode chambers 19 are filled with it.

In addition, in between the outer peripheral surface of the cylindrical body 4015 and the inner peripheral surface of the protection can 4011, the biasing member 4017 consisting of carbon fiber mat is held in the protection can 4011 in a compressed state in the thickness direction. To the positive electrode chamber 18 which is formed in the cylindrical body 1405, a current collector 4020 made of carbon fiber compressed which is impregnated with the molten sulfur 16 is bonded by pressing.

Further, the recovery pipe 110 made of metal is provided in the central portion of this current collector 4020 and functions as anode. At the bottom of the positive electrode chamber 18, the bottom lid 111 made of metal is bonded by glass adhesive to the lower end surface of the cylindrical body 4015. By the above, the positive electrode chamber 18 is formed as a closed space.

In addition, the bottom lid 111 becomes the bottom of the protection can 4011 by being welded to the side peripheral portion of the protection can 4011. Further, the sodium storage container 4013 is joined to the cathode terminal 4022, the upper portion of that protrudes upwardly through the through hole of the protection can 4011. Furthermore, on the upper side of the protection can 4011, anode terminal 4023 has been junction.

At the time of discharge, in this sodium-sulfur battery 1, the molten sodium 14 in the negative electrode chambers 19 acts as a sodium ion, transmits through the portion of the bulkhead of the solid electrolyte of the cylindrical body 4015, moves to the positive electrode chamber 18, reacts with molten sulfur 16, and discharges to generate sodium sulfide. The same amount of molten sodium 14 which was moved to the positive electrode chamber 18 from the negative electrode chambers 19 by discharge is replenished from molten sodium 14 housed in the sodium storage container 4013. Therefore, at the time of discharge, the molten sodium 14 in the sodium storage container 4013 is reduced and sodium sulfide in the positive electrode chamber 18 is increased. When charging, sodium sulfide in the positive electrode chamber 18 is decomposed, becomes sodium ions and the molten sulfur 16. And the sodium ions pass through a portion of the solid electrolyte partition of the cylindrical body 4015, move to the negative electrode chambers 19 to generate the molten sodium 14, and are returned to the sodium storage container 4013.

In this embodiment, at the time of reaction the charge and discharge as described above, the molten sulfur 16 or sodium sulfide which has been sucked up by the pump 120 from the sulfur storage container 4030 through the inlet of the first supply tube portion 101 is sent to through the outlet of the second supply tube portion 102 to the positive electrode chamber 18 via the supply pipe 100. Then, the molten sulfur 16 or sodium sulfide which has been filled with the positive electrode chamber 18 moves to the sulfur storage container 4030 from the inlet of the recovery pipe 110 through the outlet of it via the recovery pipe 110.

At the time of discharge, the molten sulfur 16 is sent to the positive electrode chamber 18 from the sulfur storage container 4030 and is subjected to the reaction with sodium ions. On the other hand, generated sodium sulfide moves to the sulfur storage container 4030.

When charging, sodium sulfide is sent to the positive electrode chamber 18 from the sulfur storage container 4030, is decomposed, and becomes molten sulfur 16. On the other hand, generated sulfur 16 moves to the sulfur storage container 4030. The control device 130 adjusts the amount and speed to move of the molten sulfur 16 and sodium sulfide depending on charging and discharging of the battery by controlling the operating status of the pump.

In this embodiment, a large output can be obtained while maintaining the large battery capacity to improve the performance of the battery as described above. The shape of the cylindrical body consisting of a solid electrolyte used in Example 3 is not limited to those described above, for example, as shown in FIG. 5, the second cylindrical body 5025 having three positive electrode chambers 5028 can be also used.

Figure 5:
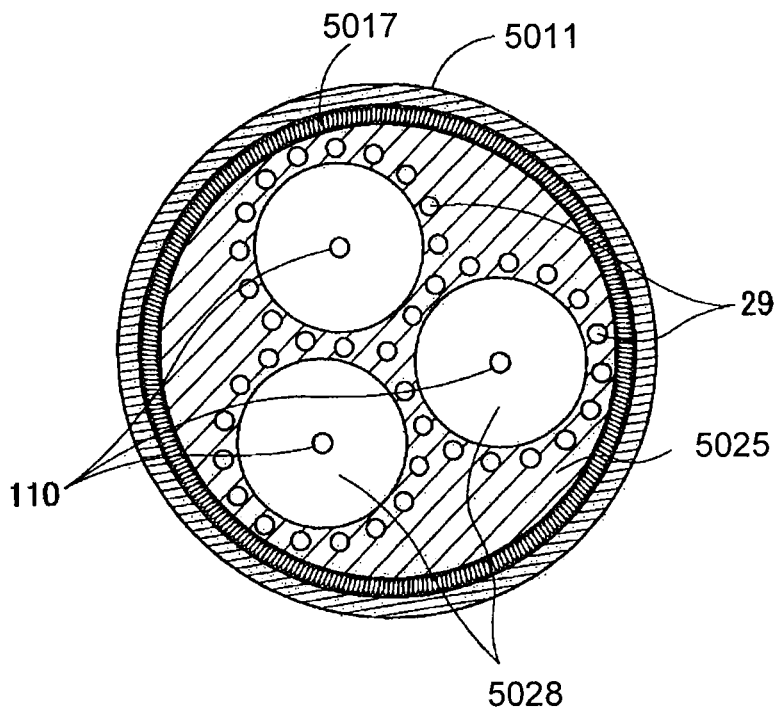
FIG. 5 is a cross-sectional view of a sodium-sulfur battery using a second tubular body formed by the solid electrolyte.

In addition, FIG. 5 is a cross-sectional view of a sodium-sulfur battery using this second cylindrical body 5025. Similar to the cylindrical body 4015, the second cylindrical body 5025 is pillar shape extending in the axial direction of the circular periphery. The second cylindrical body 5025 is housed in a cylindrical protection can 5011 made of metal, the biasing member 5017 is disposed between the outer peripheral surface of the second cylindrical body 5025 and the inner peripheral surface of the protection can 5011.

As shown in FIG. 5, three positive electrode chambers 5028 which are parallel to the direction of axis are formed inside of the second cylindrical body 5025. The positive electrode chamber 5028 is a shape of holes extending in the axial direction of the circular cross section. And a number of the negative electrode chamber 29 is formed at regular intervals along the walls of three positive electrode chambers 5028 in the circumferential direction and at a slight distance from this wall.

The negative electrode chamber 29 is a shape of pores extending in the axial direction. By such a shape of the second cylindrical body 5025, the area where the positive electrode chamber 5028 and the negative electrode chamber 29 are in contact at intervals becomes wider because the number of positive electrode chamber 5028 increases. In other words, since the area of the solid electrolyte partition is wilder, more sodium ion can be transmitted through the electrolyte and react per unit time.

Thus, the output of the battery improves. On the other hand, by such a shape of the second cylindrical body 5025, the amount of the molten sulfur 16 housed in the positive electrode chamber 5028 is reduced. However, in the present invention, since a large amount of the molten sulfur 16 can be housed in the sulfur storage container 4030, it can be supplied continuously into each of the positive electrode chamber 5028 through the supply pipe 100 by driving the pump 120. Therefore, it is possible to realize a high-power battery without lowering the battery capacity.

Figure 6:
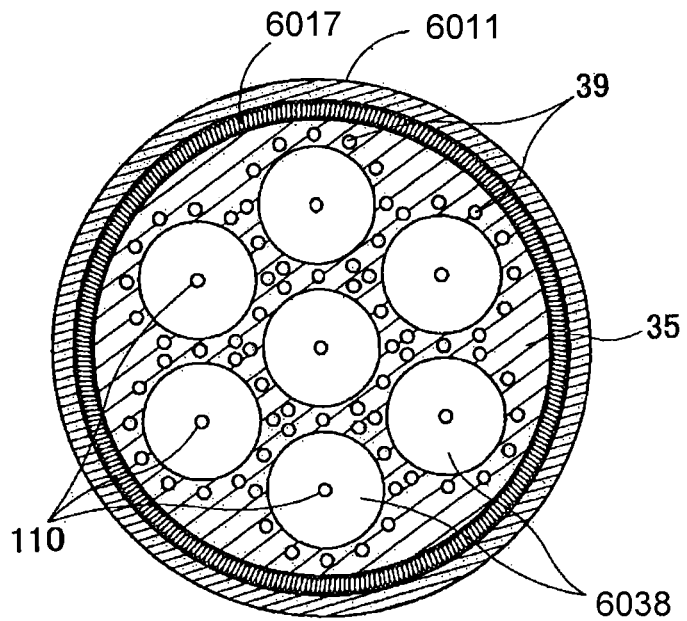
FIG. 6 is a cross-sectional view of a sodium-sulfur battery using a third tubular body formed by the solid electrolyte.

Further, as shown in FIG. 6, the third cylindrical body 35 having seven positive electrode chambers 6038 can be also used.

In addition, FIG. 6 is a cross-sectional view of a sodium-sulfur battery using this third cylindrical body 35. Similar to the cylindrical body 4015, the third cylindrical body 35 is pillar shape extending in the axial direction of the circular periphery. The third cylindrical body 35 is housed in a cylindrical protection can 6011 made of metal, the biasing member 6017 is disposed between the outer peripheral surface of the third cylindrical body 35 and the inner peripheral surface of the protection can 6011.

As shown in FIG. 6, seven positive electrode chambers 6038 which are parallel to the direction of axis are formed inside of the third cylindrical body 35. The positive electrode chamber 6038 is a shape of holes extending in the axial direction of the circular cross section. And a number of the negative electrode chamber 39 is formed at regular intervals along the walls of seven positive electrode chambers 6038 in the circumferential direction and at a slight distance from this wall. The negative electrode chamber 39 is a shape of pores extending in the axial direction.

By such a shape of the third cylindrical body 35, the amount of molten sulfur 16 housed in the positive electrode chamber 6038 will be further reduced. However, since the number of the positive electrode chamber 6038 is further increased, wide area can be used as the solid electrolyte partition. Therefore, in this case, the present invention is more preferably used, and it is possible to realize a high-power battery without reducing the battery capacity.

Figure 7:
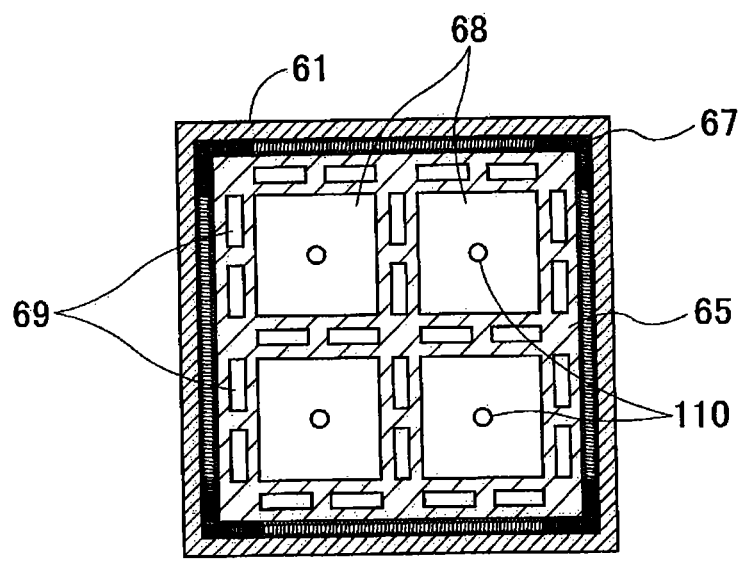
FIG. 7 is a cross-sectional view of a sodium-sulfur battery using a fourth cylindrical body formed by the solid electrolyte.

Further, as shown in FIG. 7, the fourth cylindrical body 65 having four positive electrode chambers 68 can be also used. In addition, FIG. 7 is a cross-sectional view of a sodium-sulfur battery using this fourth cylindrical body 65. As shown in FIG. 7, the fourth cylindrical body 65 is pillar shape extending in the axial direction of the outer peripheral shape of the rectangle. The fourth cylindrical body 65 is housed in a cylindrical protection can 61 made of metal, and the biasing member 67 is disposed between the outer peripheral surface of the fourth cylindrical body 65 and the inner peripheral surface of the protection can 61. The outer peripheral shape of the protection can 61 is rectangle. Inside of the fourth cylindrical body 65, four positive electrode chambers 68 which are parallel to the direction of axis are formed as the same shape position as the fourth cylindrical body 65.

Positive electrode chamber 68 is a shape of holes extending in the axial direction of the rectangular cross section. And the negative electrode chamber 69 is formed continuously at regular intervals along the walls of four positive electrode chambers 68 and at a slight distance from this wall. Negative electrode chamber 69 is a shape of holes extending in the axial direction of the rectangular cross section.

By such a shape of the fourth cylindrical body 65, it is possible to form the positive electrode chamber 68 and the negative electrode chamber 69 effectively in a certain space. Therefore, even in this case, the present invention is used more preferably and it is possible to realize a high-power battery without reducing the battery capacity.

Example 4

Figure 8:
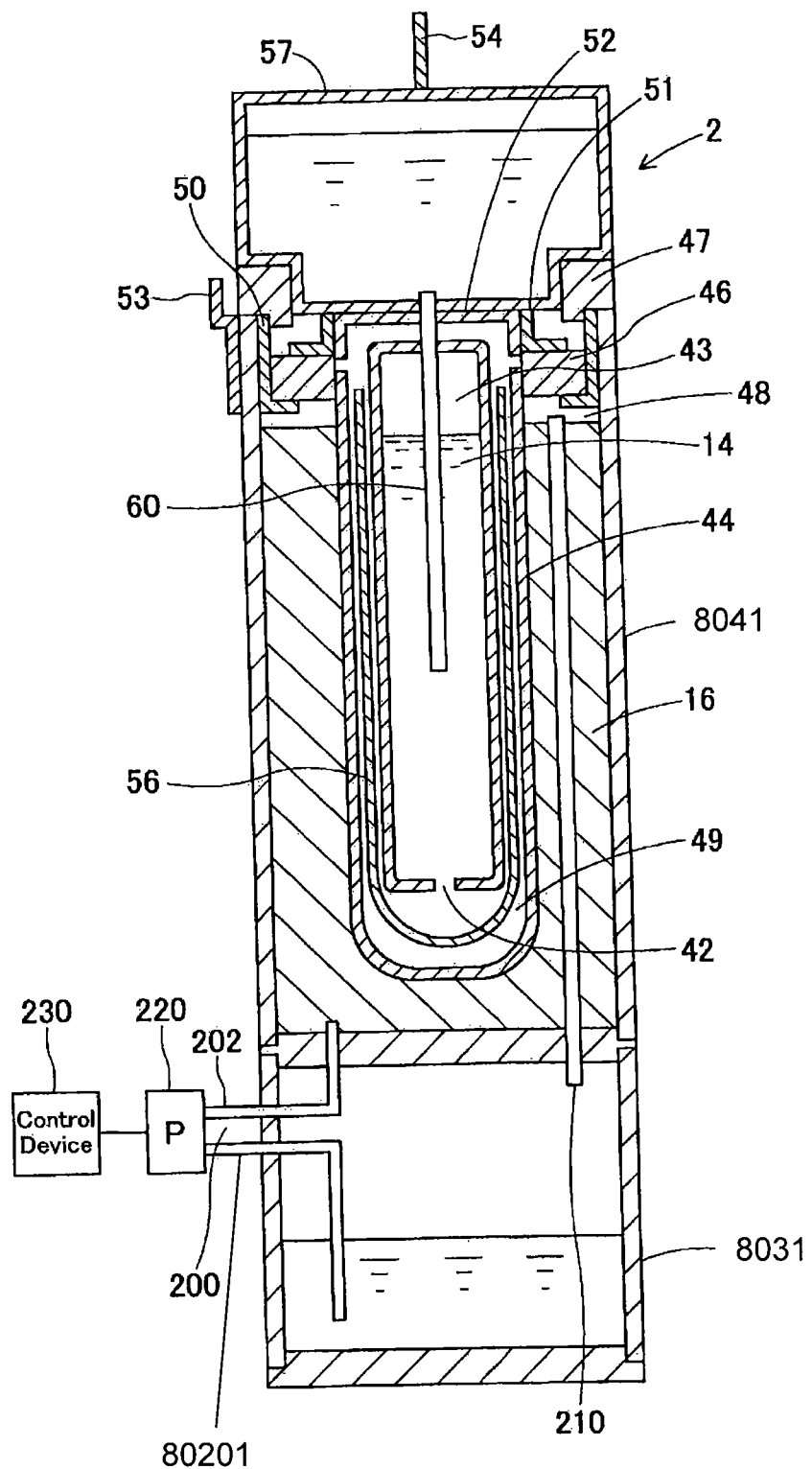
FIG. 8 is a longitudinal sectional view of a sodium-sulfur battery of Example 4.

FIG. 8 shows a longitudinal sectional view of sodium-sulfur battery of fourth embodiment of the present invention.

This sodium-sulfur battery 2 is composed primarily by a positive electrode container 8041 of bottomed cylindrical shape made of material, a solid electrolyte pipe 44 of bottomed cylindrical shape made off alumina arranged on the inside of the positive electrode container 8041, a negative electrode container 43 of bottomed cylindrical shape arranged on the inside of the solid electrolyte pipe 44 and provided with a small hole 42 at the bottom, a sodium storage container 57 of substantially bottomed cylindrical shape made of metal arranged on the top end of the positive electrode container 8041, a sulfur storage container 8031 of bottomed cylindrical shape made of metal arranged integrally at the lower end of the positive electrode container 8041, a supply pipe 200 made of metal, a recovery pipe 210, a pump 220 which is arranged on the outside of the sulfur storage container 8031 and is supplying molten sulfur via the supply pipe 200, and a control device 230 which is connected a pump 220 and controls the driving of it.

And, the molten sulfur 16 is accommodated in the positive electrode chamber 48 which is partitioned by the inner peripheral surface of the positive electrode container 8041 and the outer peripheral surface of the solid electrolyte pipe 44 and formed as a closed space as noted below. The molten sodium 14 is accommodated in the negative electrode container 43. Further it is accommodated in the sodium storage container 57 which is located on top of the negative electrode container 43. In addition, a part of molten sulfur 16 is accommodated in the sulfur storage container 8031.

The supply pipe 200 consists of the first supply pipe portion 80201 which connects the sulfur storage container 8031 and the pump 220, and the second supply pipe portion 202 which connects the pump 220 and the positive electrode chamber 48. The first supply pipe 80201 passes through the side of the sulfur storage container 8031, is welded at through portion, and communicates with the pump 220 beyond. Inlet of it is arranged at the bottom of the sulfur storage container 8031.

The second supply pipe 202 passes through the bottom of the positive electrode container 8041, is welded at through portion, further passes through the side of the sulfur storage container 8031, is welded at through portion, and communicates with the pump 220 beyond. Outlet of it is arranged at the bottom of the positive electrode chamber 48.

The recovery pipe 210 passes through the positive electrode container 8041, is welded at through portion, and communicates with the positive electrode chamber 48 and the sulfur storage container 8031. Inlet of it is arranged at the top of the positive electrode chamber 48 and outlet of it is arranged at the top of the sulfur storage container 8031.

The positive electrode container 8041 and the solid electrolyte tube 44 are coupled through the first insulating ring 46 and positive electrode bracket 50. Thus, the positive electrode chamber 48 becomes closed space. Negative electrode bracket 51 is joined to the upper end surface of the first insulating ring 46. Negative electrode lid 52 is fixed by welding to this bracket 51.

The sodium storage container 57 is joined to the upper end surface of the negative electrode lid 52. Further, a communicating pipe 60 made of metal which passes through the upper end surface of the negative electrode lid 52 and the negative electrode container 43 from bottom of this sodium storage container 57 and is welded at through portion is provided.

The communicating pipe 60 communicates with the sodium storage container 57 and the negative electrode container 43, and molten sodium moves inside it. The sulfur storage container 57 and the positive electrode container 8041 are coupled through the second insulating ring 47. The positive terminal 53 and the negative terminal 54 are arranged on the outer peripheral surface of the top of the positive electrode container 8041 and on the upper surface of the sodium storage container 57, respectively. In addition, a safety tube 56 of bottomed cylindrical shape is provided in the outside of the negative electrode container 43 and the inside of the solid electrolyte tube 44.

At the time of discharge, in this sodium-sulfur battery 2, the molten sodium 14 in the negative electrode container 43 is supplied into the safety tube 56 through the small hole 42, and the safety tube 56 is filled with the supplied molten sodium 14. Further, it is supplied into the negative electrode chamber 49 formed between the solid electrolyte tube 44 and the safety tube 56. And the molten sodium 14 in the negative electrode chamber 49 acts as a sodium ion, transmits through the solid electrolyte tube 44, moves into the positive electrode chamber 48, discharges in contact and react with the molten sulfur 16 to generate sodium sulfide. The molten sodium 14 which was reduced by being used the react of inside the negative electrode chamber 49 is replenished from the sodium storage container 57 through the communicating pipe 60 made of metal, further it is used for the react.

When charging, sodium sulfide in the positive electrode chamber 48 is decomposed, becomes sodium ions and the molten sulfur 16. Sodium ions pass through the solid electrolyte tube 44, move into the negative electrode chamber 49 to generate the molten sodium 14, and are returned to the negative electrode container 43 and the sodium storage container 57. In this embodiment, at the time of reaction the charge and discharge as described above, the molten sulfur 16 or sodium sulfide which has been sucked up by the pump 220 from the sulfur storage container 8031 through the inlet of the first supply tube portion 80201 is sent to through the outlet of the second supply tube portion 202 to the positive electrode chamber 48 via the supply pipe 200. Then, the molten sulfur 16 or sodium sulfide which has been filled with the positive electrode chamber 48 moves to the sulfur storage container 8031 from the inlet of the recovery pipe 210 through the outlet of it via the recovery pipe 210.

In addition, the control device 230 adjusts the amount and speed to move of the molten sulfur 16 or sodium sulfide depending on charging and discharging of the battery by controlling the operating status of the pump. Therefore, in this embodiment, a large output can be obtained while maintaining the large battery capacity to improve the performance of the battery.

Example 5

Figure 9:
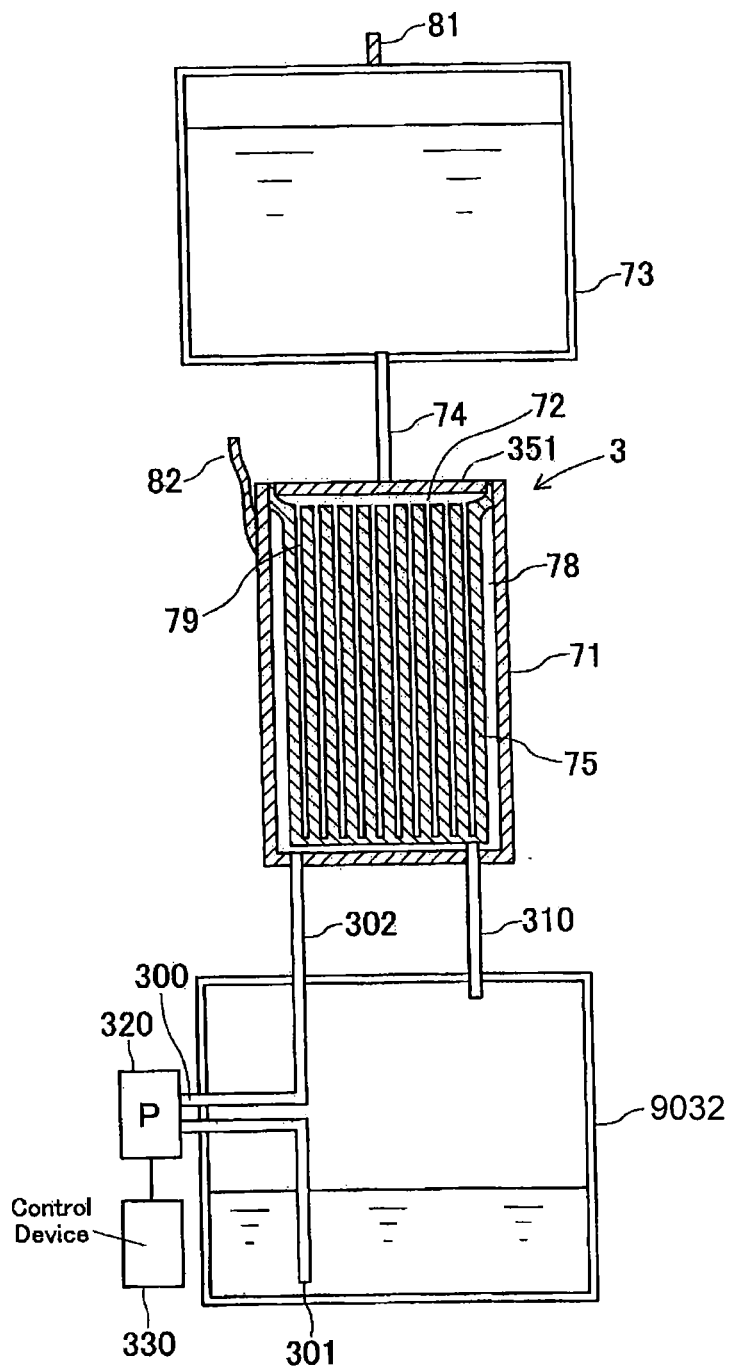
FIG. 9 is a longitudinal sectional view of a sodium-sulfur battery of Example 5.
Figure 10:
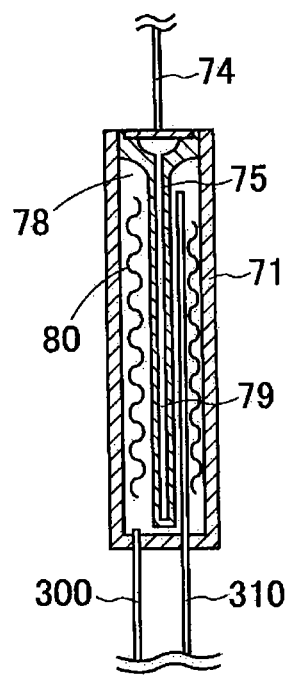
FIG. 10 is a side cross-sectional view of a substantial parts of sodium-sulfur battery of Example 6.

FIG. 9 shows a longitudinal sectional view of a sodium-sulfur battery 3 of the fifth embodiment of the present invention, and FIG. 10 shows the side cross-sectional view of an essential part of that. This sodium-sulfur battery 3 is composed primarily by a box-shaped protection can 71 made of metal, a plate-like body 75 made of β-alumina and held within the space of the protection can 71, a sodium storage container 73 arranged independently and separately from the protection can 71, a communicating pipe 74 which is made of metal and communicates with the sodium storage container 73 and the protection can 71, a sulfur storage container 9032 arranged independently and separately from the protection can 71, a supply pipe 300 and a recovery pipe 310 which are made of metal and communicate with the sulfur storage container 9032 and the protection can 71, a pump 320 which is arranged on the outside of the sulfur storage container 9032 and supplies the molten sulfur 16 via the supply pipe 300, and a control device 330 which is connected a pump 320 and controls the driving of it.

Then, the internal space formed by the inner circumferential surface of the protection can 71 and the outer peripheral surface of the plate-like body 75 becomes the positive electrode chamber 78. A plurality of pore-shaped and independent negative electrode chamber 79 are formed downward from the center of the thickness direction of the upper end surface of the plate-shaped of this plate-like body 75. As described below, the positive electrode chamber 78 are formed as a closed space, the molten sulfur 16 is housed in it. In addition, the molten sodium 14 is housed in the sodium storage container 73, and a part of the molten sulfur 16 is housed in the sulfur storage container 9032.

The supply pipe 300 consists of the first supply pipe portion 301 which connects the sulfur storage container 9032 and the pump 320, and the second supply pipe portion 302 which connects the pump 320 and the positive electrode chamber. The first supply pipe portion 301 passes through the side of the sulfur storage container 9032, is welded at through portion, and communicates with the pump 320 beyond. Inlet of it is arranged at the bottom of the sulfur storage container 9032.

The second supply pipe portion 302 passes through the bottom of the protection can 71, is welded at through portion, further passes through the side of the protection can 71, is welded at through portion, and communicates with the pump 320 beyond. Outlet of it is arranged at the bottom of the positive electrode chamber 78.

The recovery pipe 310 passes through the bottom of the protection can 71, is welded at through portion, and communicates with the positive electrode chamber 78 and the sulfur storage container 9032. Inlet of it is arranged at the top of the positive electrode chamber 78 and outlet of it is arranged at the top of the sulfur storage container 9032.

The lid 351 formed of the α-alumina is fixed and bonded integrally to the top surface of the plate-like body 75 by glass adhesive etc., and a passage 72 connecting pore-shaped negative electrode chamber 79 is formed there.

The sodium storage container 73 is placed in isolation at the top of the lid 351. Communicating pipe 74 made of metal passes through the lower end surface of the sodium storage container 73 and the upper end surface of the lid 351 respectively, and is welded at through portion. Molten sodium 14 is maintained in the sodium storage container 73, passes through the communicating pipe 74, and the passage 72, flows into all of negative electrode chamber 79, then, the negative electrode chamber 79 is filled with it.

A current collector 80 made of carbon fiber compressed which is impregnated with the molten sulfur 16 is bonded by pressing to the positive electrode chamber 78 which is formed on the outer periphery of the plate-like body 75. The top end of the protection can 71 is joined to the top end of the plate-like body 75. Then the positive electrode chamber 78 becomes a closed space. In addition, the negative terminal 81 is joined to the upper end surface of the sodium storage container 73, further, the positive terminal 82 is joined to the top of the outer peripheral surface of protection can 71.

At the time of discharge, in this sodium-sulfur battery 3, the molten sodium 14 in the negative electrode chamber 78 acts as a sodium ion, transmits through the portion of the bulkhead of the solid electrolyte in the plate-like body 75, moves to the positive electrode chamber 78, reacts with the molten sulfur 16, and discharges to generate sodium sulfide. The same amount of the molten sodium 14 which was moved to the positive electrode chamber 78 from the negative electrode chamber 79 by discharge is replenished from the sodium storage container 73.

When charging, sodium sulfide in the positive electrode chamber 78 is decomposed, becomes sodium ions and the molten sulfur 16. And sodium ions pass through a portion of the bulkhead of the solid electrolyte of the plate-like body 75, move to the negative electrode chamber 79 to generate molten sodium 14, and are returned to the sodium storage container 73.

In this embodiment, at the time of reaction of the charge and discharge as described above, the molten sulfur 16 or sodium sulfide which has been sucked up by the pump 320 from the sulfur storage container 9032 through the inlet of the first supply pipe portion 301 is sent to through the outlet of the second supply tube portion 302 to the positive electrode chamber 78 via the supply pipe 300. Then, the molten sulfur 16 or sodium sulfide which has been filled with the positive electrode chamber 78 moves to the sulfur storage container 9032 from the inlet of the recovery pipe 310 through the outlet of it via the recovery pipe 310.

In addition, the control unit 330 adjusts the amount and speed to move of the molten sulfur 16 or sodium sulfide depending on charging and discharging reacts of the battery by controlling the operating status of the pump. Furthermore, in the sodium-sulfur battery 3 of the present embodiment, most of the molten sodium 14 and the molten sulfur 16 which are subjected to the cell reaction are housed in the sodium storage container 73 and sulfur storage container 9032 respectively, only molten sodium 14 and molten sulfur 16 which are subjected to the cell reaction are housed each time in the protection can 71 where the cell reaction is carried out actually. In other words, a space for housing the active material, and a space where the active material reacts are provided separately and independently.

Differentiation by function in this way, a large output can be obtained and can be achieved with high sodium-sulfur battery safety while ensuring a large battery capacity to improve battery performance.

The invention claimed is:

1. A solid electrolyte secondary battery comprising
    a positive electrode chamber where sulfur as a positive electrode active material is housed at least,
    a negative electrode chamber where sodium as a negative electrode active material is housed at least,
    a wall, which is located between said positive electrode chamber and said negative electrode chamber, which isolates said sulfur and said sodium, and which is made of a solid electrolyte having conductivity for said sodium,
    a positive electrode active material storage container which is independent from said positive electrode chamber and housing a part of said sulfur, and
    a passage which circulates in one direction to move said sulfur from said positive electrode chamber to said positive electrode active material storage container and further circulates from said positive electrode active material storage container to said positive electrode chamber,
    wherein, when charging, moving of said sulfur from said positive electrode active material storage container to said positive electrode chamber is promoted by decreasing pressure in said positive electrode chamber because said sodium, which is ionized, transmits through said wall and moves to said negative electrode chamber from said positive electrode chamber, and
    wherein, when discharging, the moving of said sulfur from said positive electrode chamber to said positive electrode active material storage container is promoted by increasing the pressure in said positive electrode chamber because said sodium, which is ionized, transmits through said wall and moves to said positive electrode chamber from said negative electrode chamber.

2. The solid electrolyte secondary battery according to claim 1, wherein
said passage is provided with a first passage having a first one-way valve which allows said sulfur to move to said positive electrode active material storage container from said positive electrode chamber and a second passage having a second one-way valve which allows said sulfur to move to said positive electrode chamber from said positive electrode active material storage container.

3. The solid electrolyte secondary battery according to claim 1, wherein
one entrance of first and second passages is disposed at the top of said positive electrode chamber, an outlet is disposed at the top of said positive electrode active material storage container, the other entrance of said first and said second passages is disposed at the bottom of said positive electrode active material storage container, and an outlet is disposed at the bottom of said positive electrode chamber.

* * * * *